UNITED STATES PATENT OFFICE.

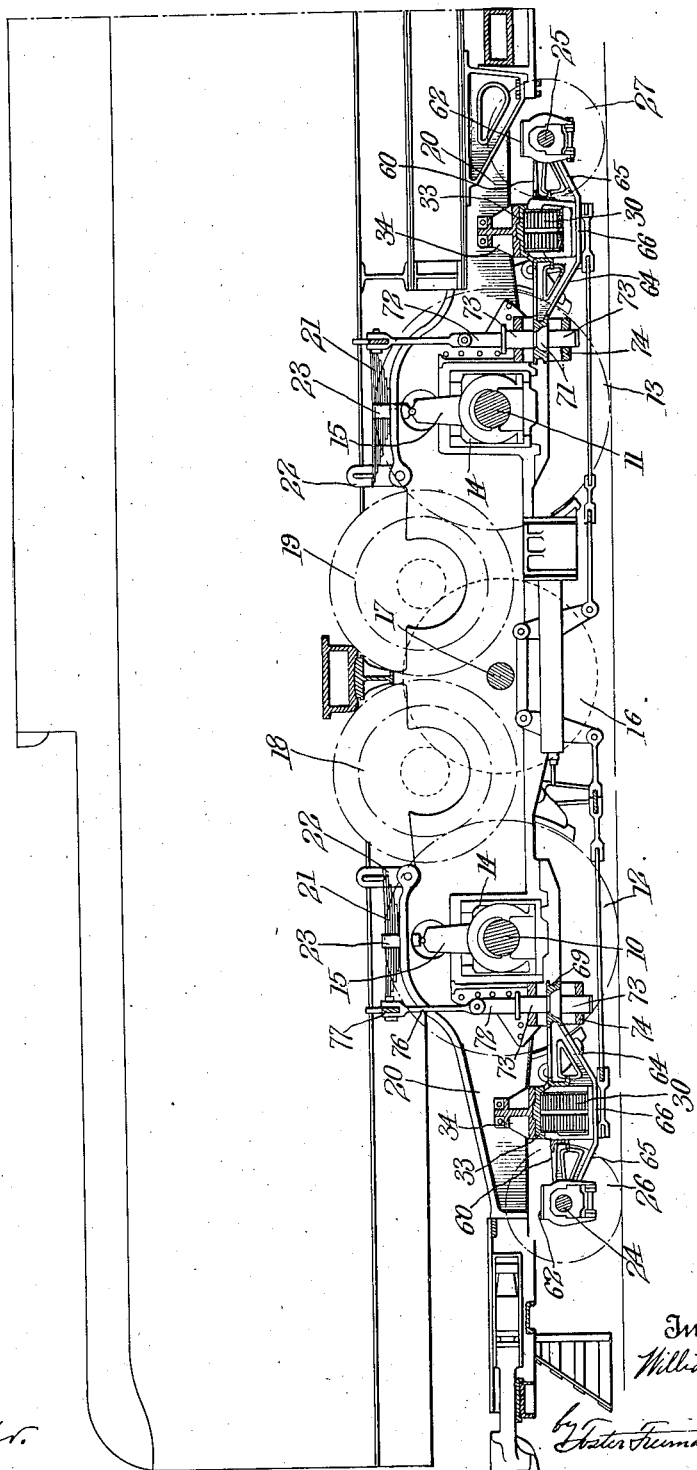

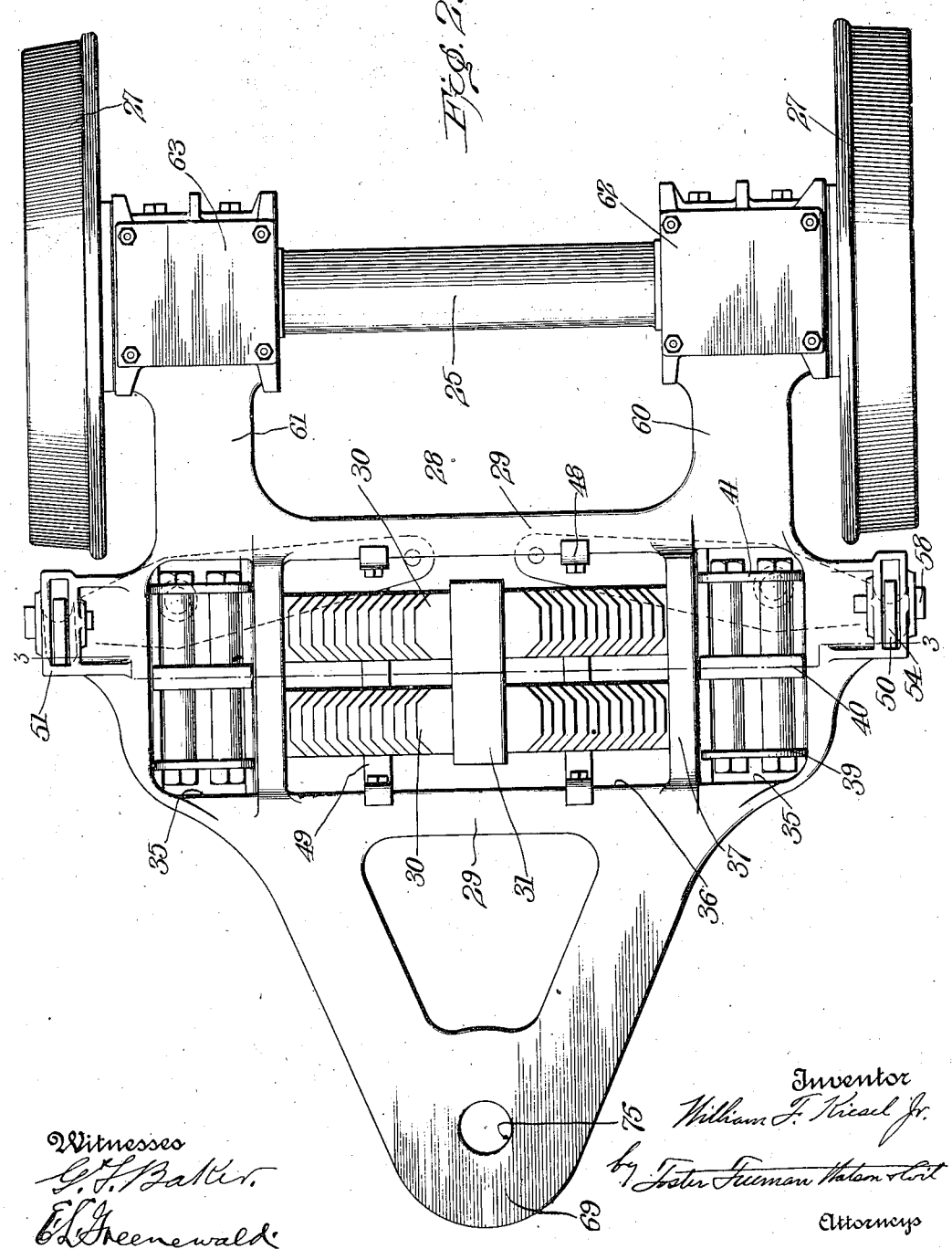

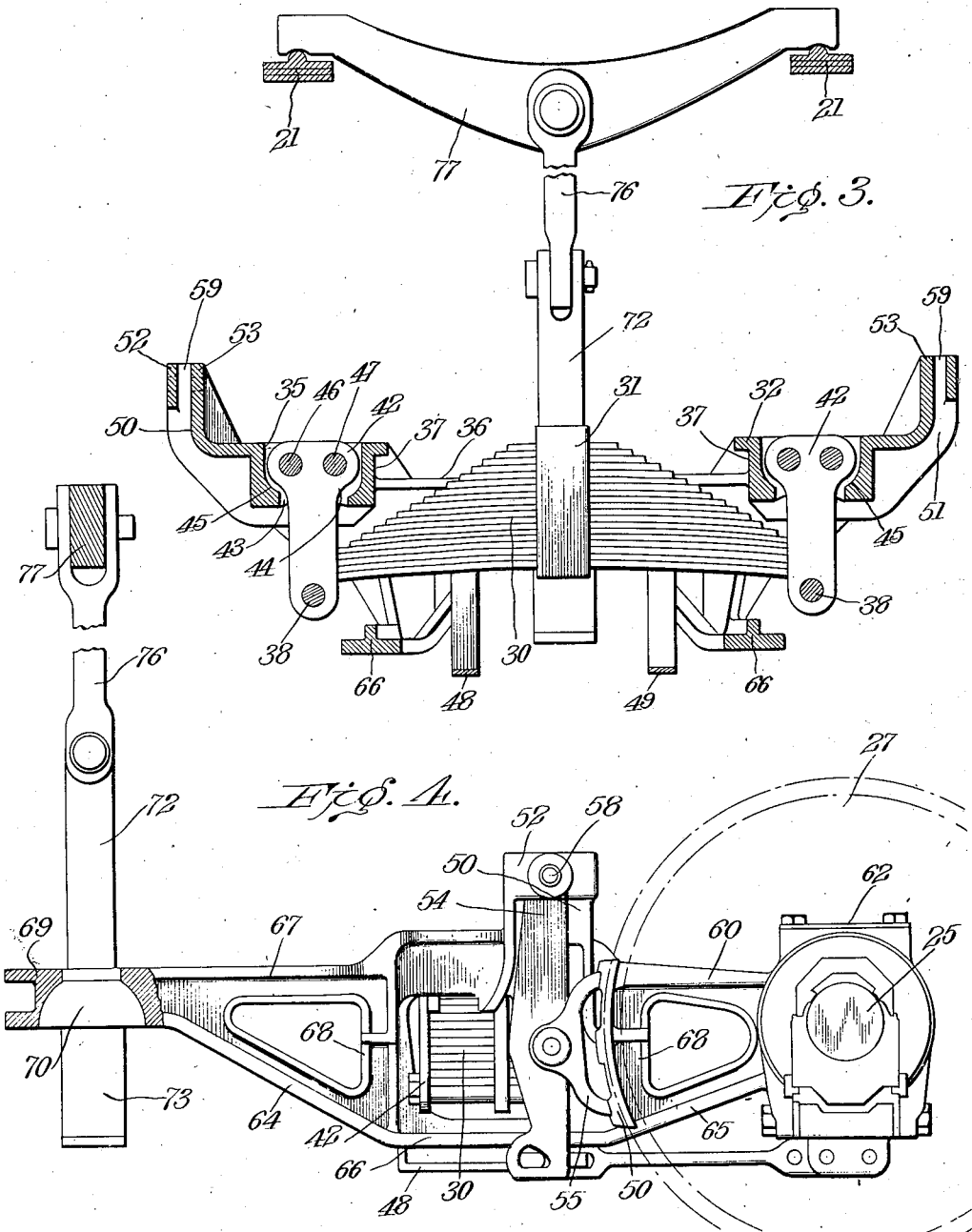

WILLIAM F. KIESEL, JR., OF ALTOONA, PENNSYLVANIA.

LOCOMOTIVE.

1,166,695.   Specification of Letters Patent.   Patented Jan. 4, 1916.

Application filed August 20, 1914. Serial No. 857,719.

*To all whom it may concern:*

Be it known that I, WILLIAM F. KIESEL, Jr., a citizen of the United States, and resident of Altoona, Blair county, State of Pennsylvania, have invented certain new and useful Improvements in Locomotives, of which the following is a specification.

My invention relates to electric locomotives and more particularly to the construction and arrangement of the pony trucks thereof.

The invention has for one of its objects to provide means whereby the load on the truck is carried at three points, thus giving a three point suspension, together with means for attaching a brake mechanism thereto for the purpose of increasing the braking safety factor of the locomotive to which it is applied.

Another of the objects is to provide a practical method of weight equalization whereby the weight of the locomotive carried by the pony truck is transferred not only to the journal boxes of the said truck but also to the journal boxes of the main drivers of the locomotive through an equalizing beam and spring arrangement.

The above and other objects, and the novel features of my invention will be apparent from the following description, taken in connection with the drawings, in which:

Figure 1 is a central longitudinal sectional view of the forward end of the locomotive truck, the cab thereof being shown in outline; Fig. 2 is a top plan view of a pony truck constructed according to this invention; Fig. 3 is a transverse cross-section on the line 3—3 of Fig. 2; and Fig. 4 is a side elevation of the pony truck.

Referring to Fig. 1, 10 and 11 designate the forward main driver shafts or axles which have pairs of wheels 12 and 13 fixed thereto at the end of the axle. The axles also support suitable journal boxes 14 upon which are mounted brackets 15.

The driver wheels 12 and 13 are connected to a main drive wheel 16 by suitable connecting rods, the drive wheel 16 being carried by a jack-shaft 17 which is suitably geared to the motors 18 and 19. The jack-shaft 17, as well as the motors 18 and 19, and their shafts, are suitably mounted in side frame members 20.

The side frame members 20 are connected and supported by the inner ends of the springs 21 by means of links 22 which are pivoted to the side frame member 20. The springs 21 each consist of a plurality of superposed flat spring plates tied together by a band 23 and fulcrumed at the upper end of the bracket 15 which rests on the journal box 14.

Equally distant from the driver axles 10 and 11 are two pony truck axles 24 and 25 which have pairs of pony truck wheels 26 and 27 fixed thereto on the ends thereof.

The pony truck frame 28 is shown in Fig. 2, and consists of a single casting substantially in the shape of the letter A, the cross bars 29 thereof representing the transom bars between which a pair of transverse springs 30, 30 is hung. The springs 30, 30 each comprise a series of superposed flat spring plates tied together by bands 31, the tops of the bands extending above the upper edge 32 of the adjacent part of the truck frame. The bands 31 carry the truck bolster casting 33 upon which rest the angle plates 34 which are riveted to the inside of the side frame members 20 of the truck. It will therefore be observed that the weight carried by the truck is transferred from the locomotive frames to the truck springs 30 through the truck bolsters 33.

At the ends of the cross bars 29, 29 of the pony truck frame and near the outside edge of the frame there are cavities 35 open at the bottom and top and separated from the spring opening 36 by cross members 37.

The pair of springs extending into the spring compartment 36 is supported at its lower side by cross-bolts 38 which are hung from the links 39, 40 and 41. The link 40 is thicker than the outside links 39 and 41 and is disposed between the ends of the two springs. The links are each T-shaped, having a head 42 disposed in the cavity 35. The lower opening 43 in the cavity is of smaller size than the head 42 of each link whereby the links will be retained in place, should the primary supporting means fail, by the shoulder 44 thereof engaging the ledge 45 at the bottom of the cavity. The primary supporting means for each group of three links at the ends of the springs comprises a pair of cross bolts 46 and 47 which extend through openings in the head 42 of each of the links and have their ends resting on ledges in the cavity. Brackets 48 and 49 are hung from the cross members 29 and pass under the springs 30, being spaced therefrom and serving to hold up the springs in case the bolts 38 or any of the spring hanger links or parts fail.

Brackets 50 and 51 are formed integral with the frame and are located outside the cavities 35 on the transverse central line of the truck frame. The brackets 50 and 51 extend upwardly above the surface 32 and have spaced parts 52 and 53 to receive between them the upper end of a brake lever 54 which has pivoted thereto the brake head 55 carrying the brake shoe 56. The spaced members 52 and 53 have co-axially arranged holes 57 drilled therein to receive the pin 58 whereby the brake levers 54 may be pivotally secured to the brackets. The slots or spaces 59 in the brackets are so positioned that the brake hangers and brake heads will be located directly in line with the wheels 27 of the truck.

The legs 60 and 61 of the truck frame are parallel and have journal boxes 62 and 63 at their ends to fit the axle 25 whereby the frame is rockably supported at two points on the said axle between the wheels 27.

As will be seen from an inspection of Figs. 3 and 4, the frame 28 has converging parts at one end and is of open-work construction and has front and rear inclined bracing members 64 and 65 joined together by horizontal bracing members 66 which are connected to the main horizontal portion 67 of the frame by vertical bracing parts 68. The top 69 of the frame has a spherical socket 70 in its lower side in which fits the hemispherical ball member 71 located near the lower end of a vertical hanger rod 72. The hanger rod 72 extends through guide sleeves 73 located on opposite sides of the top end 69 and held in position by bracket members 74 connected to the main side members 20. The pony truck frame has an opening 75 therein through which the rod 72 extends upwardly where it is pivotally connected by a link 76 near the center of a cross beam or bar 77 which is supported at its ends on the opposite ends of the springs from the links 22.

The main driving springs 21 positioned above the journal boxes of the main drive axles 10 and 11 constitute a spring equalization and transfer the weight of the locomotive and frame to the main drive axle. The weight of the locomotive and frame supported by the transverse springs on the pony truck is partly transferred to the pony truck axles at two points and partly transferred to the main driver springs at one point and from them to the main driving axles, thereby effecting a three point suspension of the weight carried by the pony truck frame.

While I have shown and described my invention in detail, I do not wish to be limited to the exact construction shown and described as it is evident that numerous changes may be made therein without departing from the spirit of the invention.

Having thus described my invention, what I claim is:

1. In a locomotive, the combination of a main driver axle, wheels thereon, a pony truck axle, wheels thereon, and a frame supported at two points by said pony truck axle and between the wheels thereon, said frame having flexible connection with a support on the main driver axle, said frame also having outwardly extending portions providing brake hanger supports in line with said wheels.

2. A truck comprising two axles and wheels thereon, a frame located in the space between the wheels on said axles and extending longitudinally of the truck, said frame being supported by said axles at its ends only, a spring extending transversely of said frame between the supporting means thereof, and hangers for suspending said spring at its ends from said frame.

3. In a locomotive, the combination of a main driver axle, springs supported thereby, a pony truck axle, a frame having one end supported by the pony truck axle and having its opposite end hung from said springs on the driver axle.

4. In a locomotive, the combination of a pony truck axle, wheels thereon, a driver axle, wheels thereon, and a frame having brackets thereon for supporting braking means in line with the wheels on said pony truck axle and in the space between the pony truck wheels and driver wheels.

5. In a locomotive, the combination of a pony truck axle, wheels thereon, a frame supported by said axle between the wheels thereon, said frame having brackets formed integral therewith and extending outwardly opposite said wheels for supporting brake levers in line with the wheels on said axle.

6. In a truck the combination of a frame having an opening intermediate its ends, means for supporting the frame at its ends, a pair of springs extending transversely of said frame and having parts thereof extending upwardly into said opening in the frame, and hangers between the wheels on opposite sides of the truck, said hangers depending from the under side of said frame and suspending said springs at their ends from said frame.

7. In a locomotive, the combination of a pair of axles, wheels thereon, a main frame, a truck frame between the axles and supported thereby, means for yieldingly supporting said main frame from said truck frame, and brackets on said truck frame for supporting brake means in line with the wheels on one of said axles.

8. In a truck, the combination of side frame members, a pair of axles, wheels on said axles, braking means, a spring for supporting said side frame members, a frame carried by said axles, brackets on said frame for supporting said braking means in line with the wheels which the braking means engage, and hangers carried by said frame and supporting said spring.

9. In a pony truck for locomotives, a truck frame substantially A-shaped, means adjacent the ends of the legs thereof to support it at two points, and means adjacent the narrow end thereof to support it at a third point.

10. In a pony truck for locomotives, a frame substantially A-shaped having spaced cross-bars constituting the transom bars of the frame, and means on opposite sides of said cross bars for suitably mounting the frame on its supporting means.

11. In a pony truck construction for locomotives, the combination of a truck frame comprising a single casting substantially A-shaped and having cross-bars intermediate its ends constituting the transom of the frame, a spring, means for mounting said spring between said transom bars, said frame having means on opposite sides of the transom for mounting it on its supporting means.

12. In a pony truck for locomotives, a truck frame having means at its ends for mounting it on its support, transversely extending bars intermediate the ends of the frame and constituting the transom of the truck, and brackets at the ends of the transom for supporting brake mechanism.

13. In a truck for locomotives, a frame having brackets on opposite sides thereof for braking mechanism, a spring intermediate the brackets for supporting the locomotive body, and hangers depending from said frame for supporting said spring.

14. In a truck, the combination of a pair of axles, a frame between the axles, and means for supporting said frame from one of said axles comprising a rod and a ball-and-socket connection between the rod and said frame.

15. In a truck, the combination of a pair of axles, a frame between the axles, and means for supporting one end of said frame from one of said axles comprisng spring means mounted on said supporting axle, a member depending from said spring means, and a ball-and-socket connection between said member and one end of the frame.

16. In a locomotive, the combination of a pair of axles, a frame rockably mounted at one end on one of said axles, and means for supporting the other end of said frame from the other axle, comprising a pair of springs fulcrumed on said other axle, an equalizing device resting on said springs, a member depending from said equalizing device, and a ball-and-socket connection between said depending member and said other end of the frame.

17. In a locomotive, the combination of a main driver axle, a main frame, brackets mounted on said axle, springs fulcrumed on said brackets, links connecting one end of each of said springs to said frame, a pony truck axle, a pony truck frame supported at one end by said pony truck axle, an equalizer bar mounted at the other ends of said spring, a rod depending from said bar, and connected with said pony truck frame, a transverse spring, links for suspending the transverse spring from the pony truck frame, and a truck bolster member fastened to the main frame and resting on said transverse spring.

In testimony whereof I affix my signature in presence of two witnesses.

WILLIAM F. KIESEL, Jr.

Witnesses:
C. R. ATKINSON,
J. T. HANLON.